Figure 1:
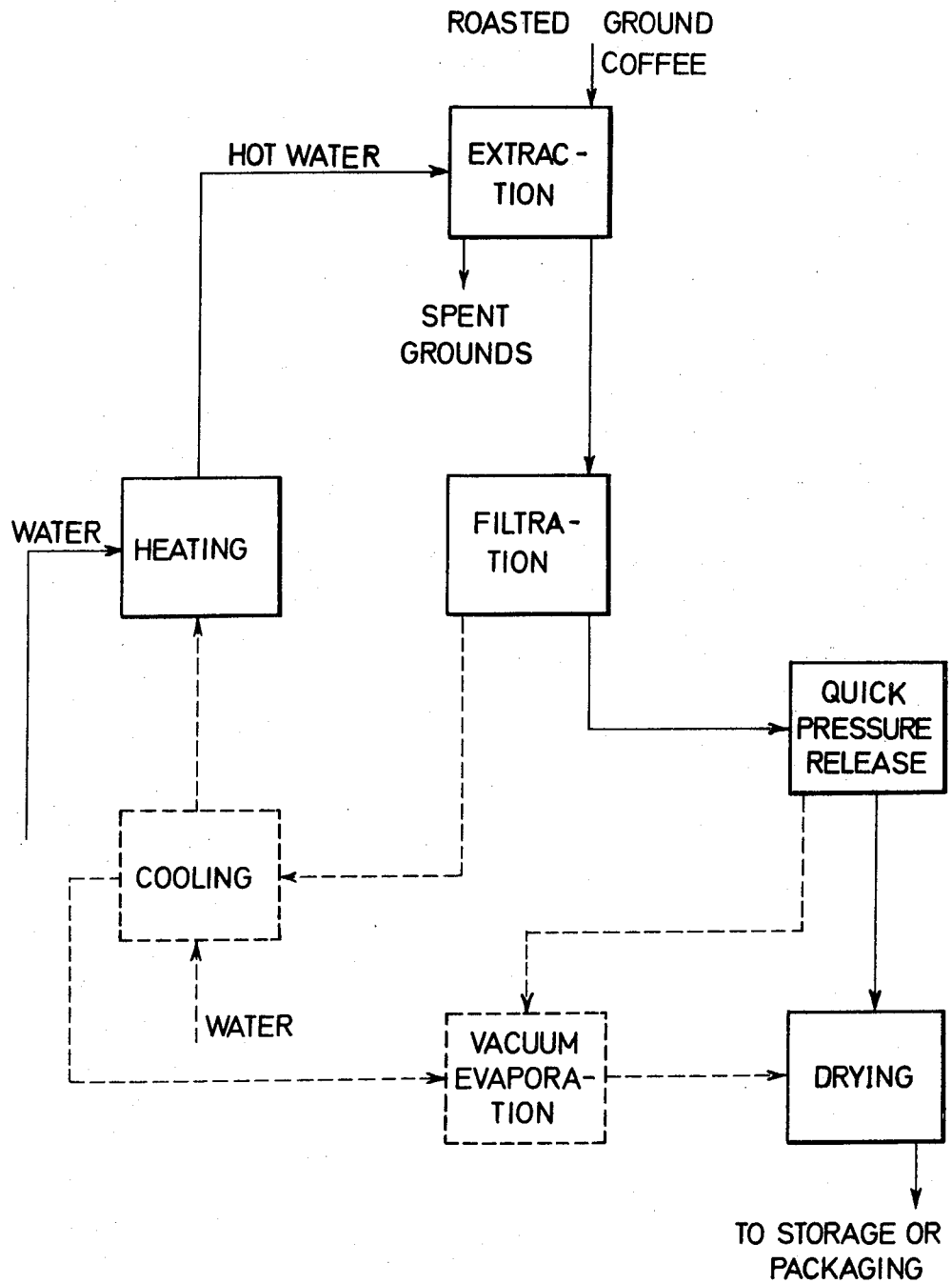

United States Patent [19]

Stoltze et al.

[11] 3,726,209
[45] Apr. 10, 1973

[54] APPARATUS FOR EXTRACTING SOLUBLE MATTER FROM A COMMINUTED MATERIAL

[75] Inventors: Asbjorn Stoltze, Holte; Knud Larsen, Hillerod; Erik Houghton-Larsen, Fredensborg, all of Denmark

[73] Assignee: Aktieselskabet Niro Atomizer, Soborg, Denmark

[22] Filed: Jan. 7, 1970

[21] Appl. No.: 1,086

[30] Foreign Application Priority Data

Jan. 9, 1969 Denmark..................................139/69

[52] U.S. Cl...................................................99/289
[51] Int. Cl...............................................A47j 31/00
[58] Field of Search....................99/236 C, 289, 287, 99/71, 73

[56] References Cited

UNITED STATES PATENTS

| | | | |
|---|---|---|---|
| 2,191,255 | 2/1940 | Bonotto | 99/289 |
| 2,264,390 | 12/1941 | Levine | 99/289 |
| 2,517,073 | 8/1950 | Alvarez | 99/289 |
| 2,629,663 | 2/1953 | Fogler | 99/289 |
| 3,005,398 | 10/1961 | Sandler | 99/287 |

*Primary Examiner*—Robert W. Jenkins
*Attorney*—Sughrue, Rothwell, Mion, Zinn and Macpeak

[57] ABSTRACT

A method of extraction of soluble matter together with colloidal particles from a comminuted material, preferably ground, roasted coffee-beans, by means of a filter which permits the passage of a substantial part of the colloidal particles present and in the immediate vicinity of which the comminuted material is introduced in the extraction container. An apparatus for carrying out the method and having a filter plate with circular slits, and associated rotatable scraper members for stirring the material to be extracted, and rotatable knife members for cleaning said slits.

2 Claims, 8 Drawing Figures

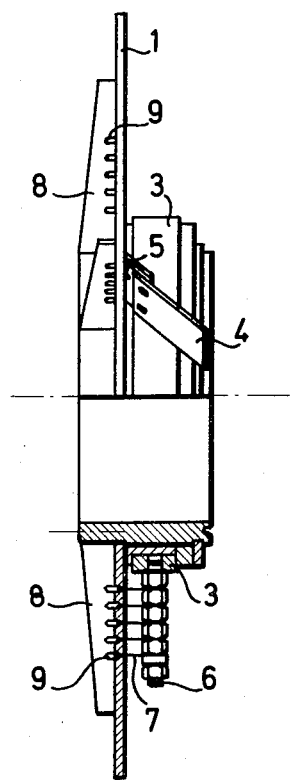
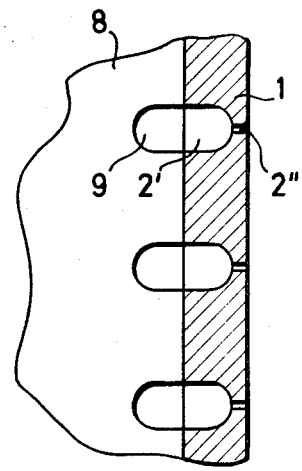
FIG. 6.  FIG. 7.
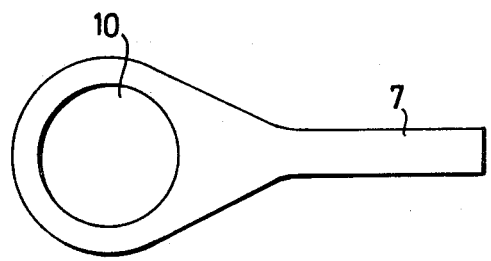
FIG. 8.

APPARATUS FOR EXTRACTING SOLUBLE MATTER FROM A COMMINUTED MATERIAL

The invention relates to a method in the countercurrent liquid extraction of soluble matter from a more or less comminuted material, the insoluble part of which comprises colloidal particles, preferably ground, roasted coffee-beans, in which the material to be extracted is kept moving constantly in directions transversely to the direction of flow of the extraction liquid.

In the production of a powdered or granular coffee extract it is known to perform the preferably aqueous extraction of the soluble constituents in roasted coffee while adding solid coffee constituents, ground to colloidal particle size, after which an extract containing solid coffee constituents of colloidal particle size and soluble coffee constituents is recovered and worked up. It is assumed that the colloidal constituents possess flavor-intensifying and flavor-preserving properties, presumably because the volatile flavor substances are bound to the colloidal particles, so that a cup of coffee made from a coffee extract powder or granulate produced in this way will as regards taste, flavor, and turbidity resemble freshly made coffee more than is the case with similar products without the colloidal constituents.

According to this known method it is, however, necessary, besides the normal grinding, to grind part of the roasted coffee, possibly after extraction, down to colloidal particle size. It is furthermore necessary for the stabilization of the colloids that at least the colloidal part of the coffee powder is adjusted to a pH-value which is about 5.2 at the most.

In connection with extraction methods, in which the material to be extracted is kept moving constantly in directions transversely to the direction of flow of the extraction liquid, it has now turned out that it is possibly in a far simpler way than is the case in the said known method to obtain an extract containing solid coffee constituents of colloidal particle size in a sufficient quantity. It is not necessary to perform a special grinding into colloids, ground coffee produced by the grinding that is normal for extraction purposes containing quite a lot of colloidal particles. When the coffee that is being subjected to the extraction process is kept moving constantly transversely to the direction of flow of the extraction liquid, a substantial part of the colloidal particles present will pass over into the extraction liquid.

The problem is now in a simple way to separate the extract from the material to be extracted while preserving the colloidal particles in the extract. This is achieved by the method according to the invention which is characterized in that the extract is separated from the material to be extracted by means of a filter which permits the passage of a substantial part of the colloidal particles present, and that the comminuted material is introduced into the extraction container in the immediate vicinity of the filter.

The filters so far used in extraction processes like that dealt with have not been arranged with a view to permitting the passage of a substantial part of the colloidal particles. In the description of the above-mentioned known method only decantation methods have been mentioned for separating the colloidal part from the non-colloidal part. It is quite obvious that a decantation will be more complicated to perform than a filtration by means of the filter employed in the method according to the invention, which filter may be incorporated as an integral part of the extraction apparatus.

By e.g. spray drying of the extract produced by the method according to the invention a product is obtained, the properties of which as regards taste, flavor, and formation of turbidity are satisfactorily improved by the colloidal particles. It is usually unnecessary to take special measures for the stabilization of the colloids.

Contributory to attaining the favorable result as regards the taste and flavor of the final product is the fact that the comminuted material is introduced into the extraction container in the immediate vicinity of the filter, the colloids being hereby withdrawn particularly effectively together with the extract, as they only have to pass a relatively short way through the material, and the retention time of the colloids in the extraction container becoming hereby the shortest possible.

This is of particular importance in the production of instant coffee where the extraction process is performed continuously under pressure at temperatures higher than 100°C, e.g. up to 180°C. As a substantial part of the volatile flavor substances are bound to the colloids, it is probable that the taste of the final product depends on the period of time in which the colloidal particles are subjected to a high temperature. By the method according to the invention is achieved that the colloidal particles in the extract are subjected to the high temperature for the shortest possible period of time. To stabilize the flavor substances further, the extract is immediately after its separation from the beans cooled to below 50°C, preferably below 40°C, below which temperature the extract is reasonably stable so as to be able to stand being stored for some time before being dried, usually by spray drying. The extract may in certain cases be cooled as far down as to 2°C, the temperature chosen being dependent on the physical properties desired of the powder obtained by the spray drying.

The invention also relates to an apparatus for carrying out the method according to the invention and of the type comprising an extraction container, transport members accommodated rotatably in the said container for moving the material to be extracted in directions transversely to the direction of flow of the extraction liquid, and a filter plate provided with circular slits, the said apparatus being characterized in that the filter plate comprises in part scraper members rotating during the operation of the apparatus and having such dimensions so as to cause a through stirring of the material to be extracted, adjacent to the filter plate, in part knife members which rotate during the operation of the apparatus and pass through the circular slits.

A filter arranged in this way is well suited for carrying out the method according to the invention. The scraper members push the material to be extracted back from the filter plate and stir the said material, so that caking is avoided, and so that the material to be extracted in this critical place is kept moving sufficiently for not acting as a filter for the colloidal particles in the extract. The knife members keep the slits clean.

Similar filters with scraper members are known, but such filters, where the scraper members in combination with the said knife members are arranged especially with a view to permitting the passage of colloidal particles to the widest possible extent, are not known.

The method according to the invention is especially intended for being carried out in an apparatus of the type comprising an elongated trough which in its longitudinal direction is placed obliquely in relation to the horizontal plane, transport members accommodated rotatably in the said trough and intended for screwing the material to be extracted through the trough and for alternately passing the material to be extracted up over and down into extraction liquid flowing through the trough under the influence of the force of gravity, and inlet opening for the comminuted material at the lower end of the trough, provided with the filter plate, and an outlet opening for the extracted material and an inlet opening for the extraction liquid at the upper end of the trough.

With such an apparatus, where the material to be extracted is caused to fill out completely the cross sectional area controlled by the transport members, an excellent extraction is obtained and at the same time a satisfactory slurrying of the colloidal particles in the extraction liquid. In such an apparatus it is according to the invention expedient that the scraper members and the knife members are mounted on a ring which can rotate together with the transport members. This is a simple and economical construction.

Even if in the above the invention is described particularly in connection with the extraction of ground, roasted coffee, it may also be applied to the production of e.g. extract of coffee substitute and otherwise in the extraction of soluble matter from any more or less comminuted material where it is desired that colloidal constituents contained in the material are also to pass over into the extract.

Figure 2:
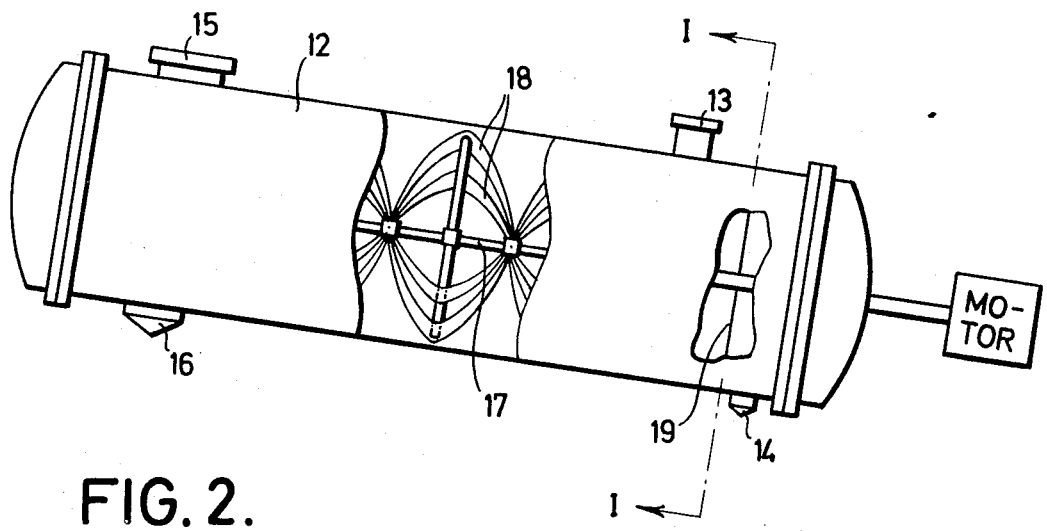
Figure 3:
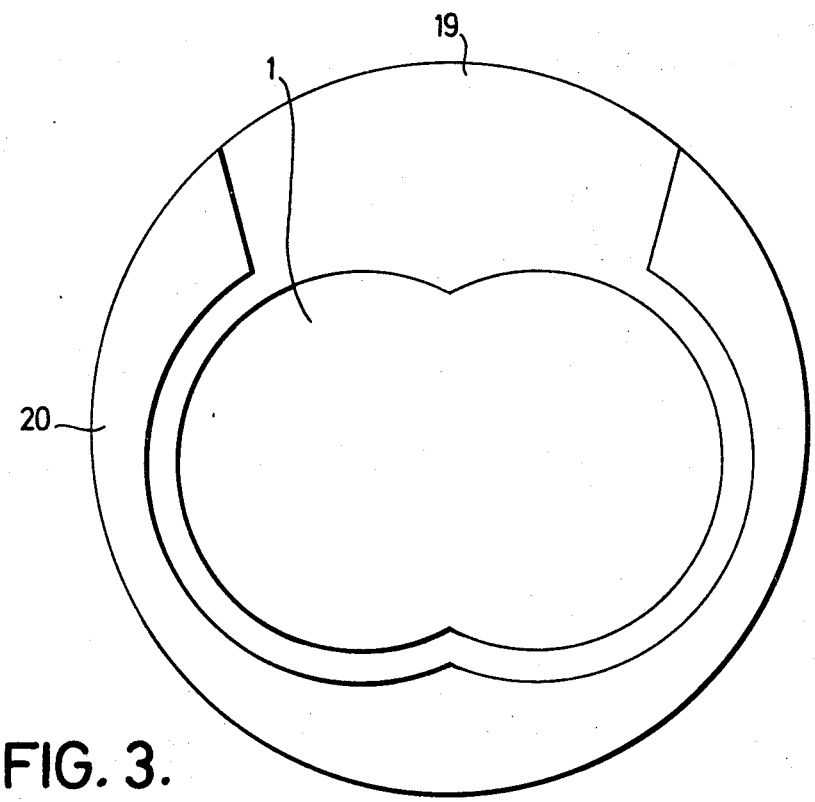
Figure 4:
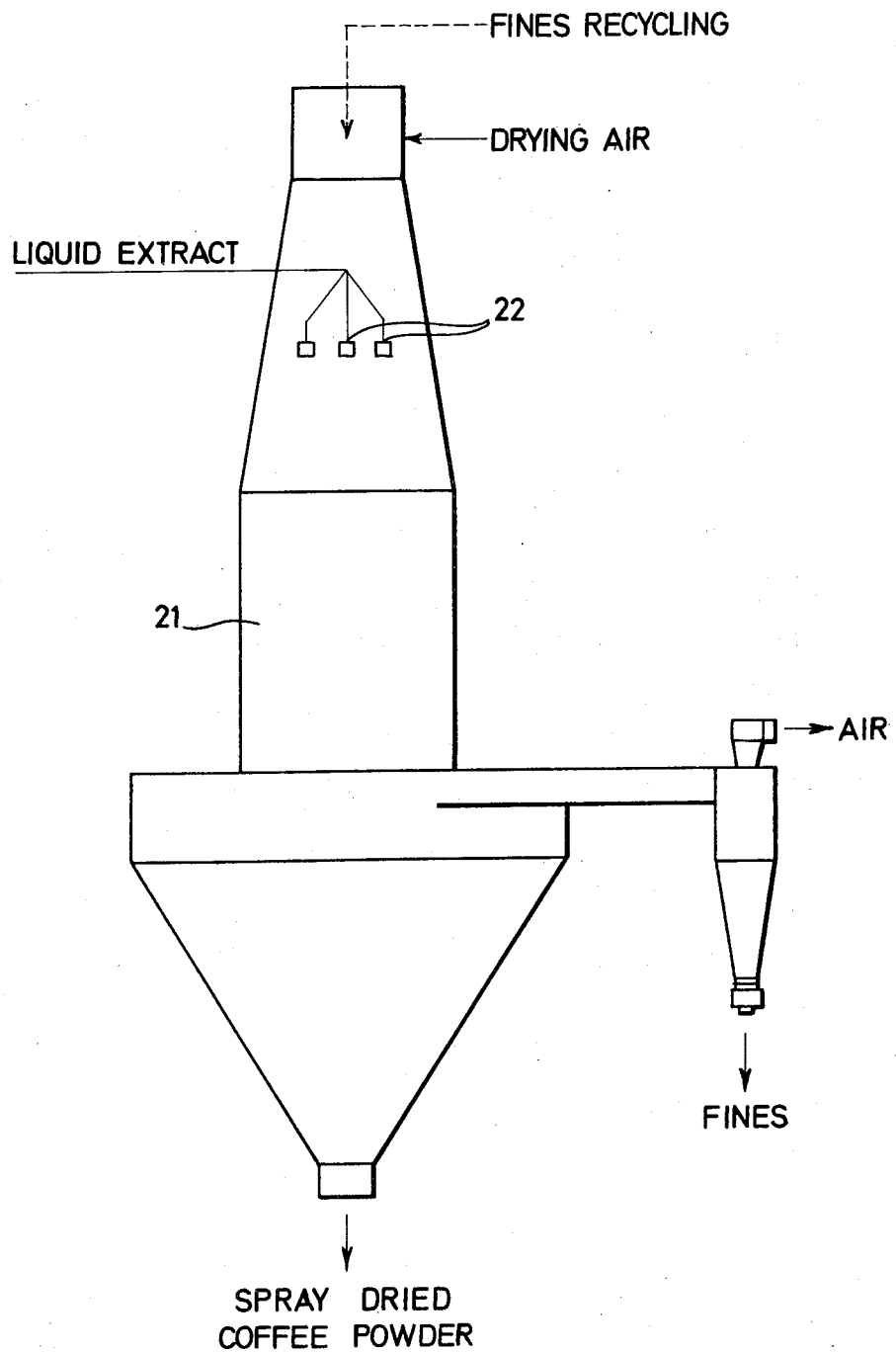
Figure 5:
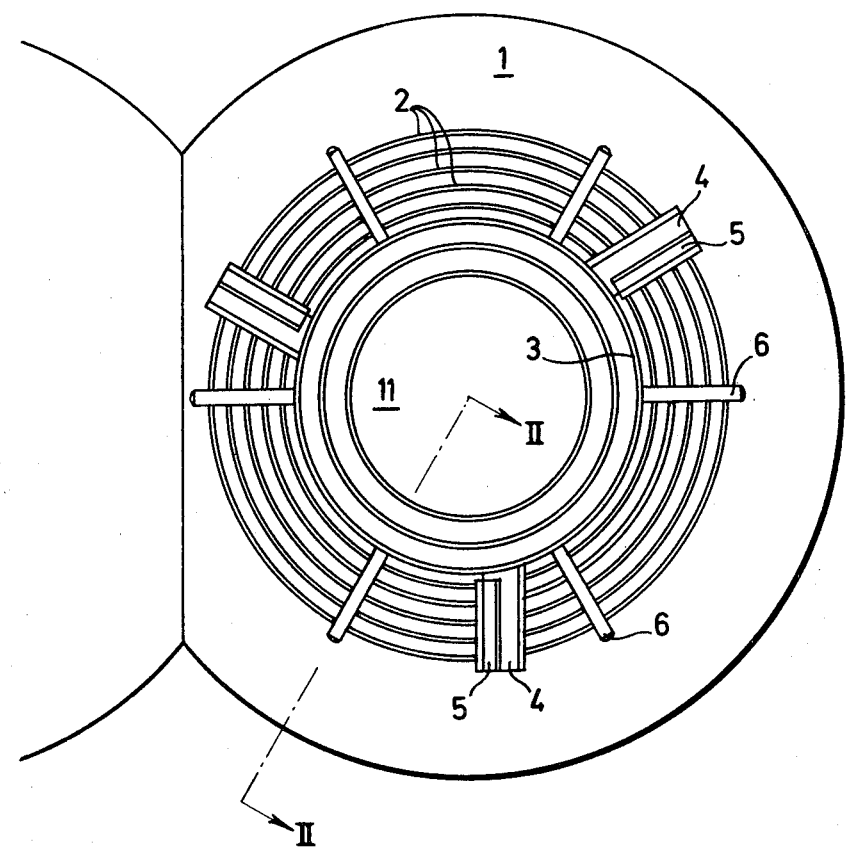

The invention will now be described further, by way of example, particularly on the basis of one embodiment of a filter for application in the method dealt with here, with reference to the accompanying drawings in which FIG. 1 is a flow sheet for a process for preparing instant coffee, within which process the method of the invention may be carried out, FIG. 2 is a diagrammatical view in side elevation of an apparatus for carrying out the method of the invention, comprising a double trough with parts of the trough side wall broken away to show the internal arrangement, FIG. 3 is a diagrammatical view, in section on line I—I, of the apparatus in FIG. 2, showing without details the arrangement of the double filter plate, FIG. 4 shows diagrammatically in side elecation a spray drying apparatus for carrying out the drying according to FIG. 1, FIG. 5 shows diagrammatically in detail half of the double filter plate of FIG. 3, with associated scraper members and knife members, the filter plate being viewed from the side facing the interior of the trough, FIG. 6 shows the filter plate in FIG. 5 viewed in part in side elevation from the right, in part in section on line II—II, FIG. 7 shows a detailed view on a larger scale of the section in FIG. 6, and FIG. 8 shows a single knife member for the filter plate in FIG. 5.

Referring to FIG. 1 the extraction may be carried out in a trough as shown in FIG. 2, under a nitrogen atmosphere, and under a pressure of e.g., 13–15 atm., the inlet and outlet temperatures of the extraction water being, e.g., 180°C and 90°C, respectively. Alternatively, and with a better result as regards taste and flavor, the extraction may be carried out in two stages, each in a trough as shown in FIG. 2, the first stage extraction being carried out in an open trough at relatively low temperatures, the inlet and outlet temperatures of the extraction water being, e.g., 90°C and 45°C, respectively, and the second stage extraction being carried out at a pressure of, e.g., 13–15 atm. and at a temperature all through the trough of, e.g., 180°C. A nitrogen atmosphere is not needed here, but is substituted by steam. The filtration may be carried out by means of the filter as illustrated in FIGS. 6 and 7, which filter permits the passage of colloidal particles as explained above. In case of a one stage extraction, the extract is then cooled, evaporated in vacuo, and dried, e.g. in a spray drying apparatus as shown in FIG. 4. In case of the preferred two stage extraction as stated above, the extract from the second stage may instead of direct cooling be deodorized by being subjected to a quick pressure release to eliminate ill-tasting substances, possibly be subjected to subsequent vacuum evaporation, and then dried by spray drying. The extract from the first stage may be freeze-dried or spray-dried and mixed with the dried extract from the second stage. The two extracts may also be dried together, possibly in the way that the deodorized liquid extract from the second stage is used as extraction liquid in the first stage.

In FIG. 2 12 denotes an elongated double trough placed obliquely in relation to the horizontal plane, 13 denotes an inlet opening for roasted ground coffee, 14 denotes an outlet opening for the extract, 15 denotes an inlet opening for the extraction liquid, and 16 denotes an outlet opening for spent grounds. Within the said trough on a shaft 17 there is provided rotatable transport members 18. An end wall 19 comprises a double filter plate as shown on FIGS. 3, 5 and 6.

In FIG. 3 the end wall 19 is shown in section with the double filter plate 1 and a heat jacket 20.

In the spray drying apparatus 21 shown in FIG. 4 22 denotes nozzles for spraying the liquid extract. The operation of said apparatus will appear from FIG. 4. Before recycling the fines is separated from the fines + gas by means of a cyclone.

1 in FIGS. 5 and 6 denotes a filter plate with circular, concentric slits 2. On a ring 3, plates 2 are welded on as holders for scraper members 5. To the ring 3 are moreover, secured bolts 6 which carry knife members 7 of the shape shown in FIG. 8. The knife members 7 are secured to the bolts 6 and separated by means of nuts, not shown.

8 in FIGS. 6 and 7 denotes welded-on, radially directed ribs which hold the filter plate 1 together and which are provided with recesses 9 for the knife members 7.

The detailed view in FIG. 7 shows the cross-sectional shape of the slits 2 in the filter plate 1. As will be seen, the slits 2 are designed with in part a part 2' corresponding to the recesses 9, in part a narrower part 2'' which in the case extraction of coffee may e.g. have a slit width of 1 mm.

The knife member 7 in FIG. 8, which has a hole 10 corresponding to the bolt 6, may for the purpose of being applied together with slits 2 with a slit width in the slit portion 2" of 1 mm be produced from 0.8 mm sheet material.

The filter plate 1 is in an optional manner known per se secured over a corresponding recess in the lower end wall in a trough as stated in claim 4. One shaft end of the transport members in the said trough is carried into a central hole 11 in the filter plate 1, see FIG. 5. The ring 3 with the scraper members 5 and the knife members 7 is arranged for rotating together with the said transport members.

What we claim is:

1. An apparatus for the countercurrent liquid extraction of soluble matter from a more or less comminuted material, the insoluble part of which comprises colloidal particles, preferably ground, roasted coffee-beans, in which the material to be extracted is kept moving constantly in directions transversely to the direction of flow of the extraction liquid of the type comprising an extraction container, transport members accommodated rotatably in the said container for moving the material to be extracted in directions transversely to the direction of flow of the extraction liquid, means for transporting the material to be extracted countercurrently to the extraction liquid, a filter plate provided with circular slits, and means for introducing the comminuted material into the extraction container in the immediate vicinity of the filter, said filter plate comprises in part scraper members rotating during the operation of the apparatus and having such dimensions so as to cause a thorough stirring of the material to be extracted, adjacent to the filter plate, in part knife members which rotate during the operation of the apparatus and pass through the circular slits.

2. An apparatus as claimed in claim 1 comprising an elongated trough which in its longitudinal direction is placed obliquely in relation to the horizontal plane, transport members accommodated rotatably in the said trough and intended for screwing the material to be extracted through the trough and for alternately passing the material to be extracted up over and down into extraction liquid flowing through the trough under the influence of the force of gravity, an inlet opening for the comminuted material at the lower end of the trough, provided with the filter plate, and an outlet opening for the extracted material and an inlet opening for the extraction liquid at the upper end of the trough, characterized in that the scraper members and the knife members are mounted on a ring which can rotate together with the transport members.

* * * * *